United States Patent

[11] 3,563,571

[72] Inventor Bruno H. Werra
    Waukesha, Wis.
[21] Appl. No. 840,198
[22] Filed July 9, 1969
[45] Patented Feb. 16, 1971
[73] Assignee Ladish Co.
    Cudahy, Wis.
    a corporation of Wisconsin

[54] ASEPTIC JOINTS
    10 Claims, 4 Drawing Figs.
[52] U.S. Cl. .................................................. 385/41;
                                                        285/367
[51] Int. Cl. ............................................. F16l 53/00
[50] Field of Search .......................................... 285/41,
                        364, 365, 366, 367, 425; 137/334, 241

[56] References Cited
    UNITED STATES PATENTS
    1,951,677  3/1934  Rosener .................... 285/41X
    FOREIGN PATENTS
    1,000,649  1/1957  Germany ................... 285/41

Primary Examiner—Dave W. Arola
Attorney—Morsell & Morsell

ABSTRACT: An aseptic joint has a sealing gasket interposed between the flanges of two pipe ends, there being a rubber ring around the gasket to form an annular steam chamber between the rubber ring and the OD of the gasket, and there being means including a steam inlet and outlet nipple with a dam between for continuously circulating steam throughout the length of the steam chamber. A clamping ring acts on the flanges of the two pipe ends to engage the gasket and rubber ring therebetween, the clamping ring having a slot through which the steam nipple projects.

PATENTED FEB 16 1971
3,563,571
Fig.1
Fig.2
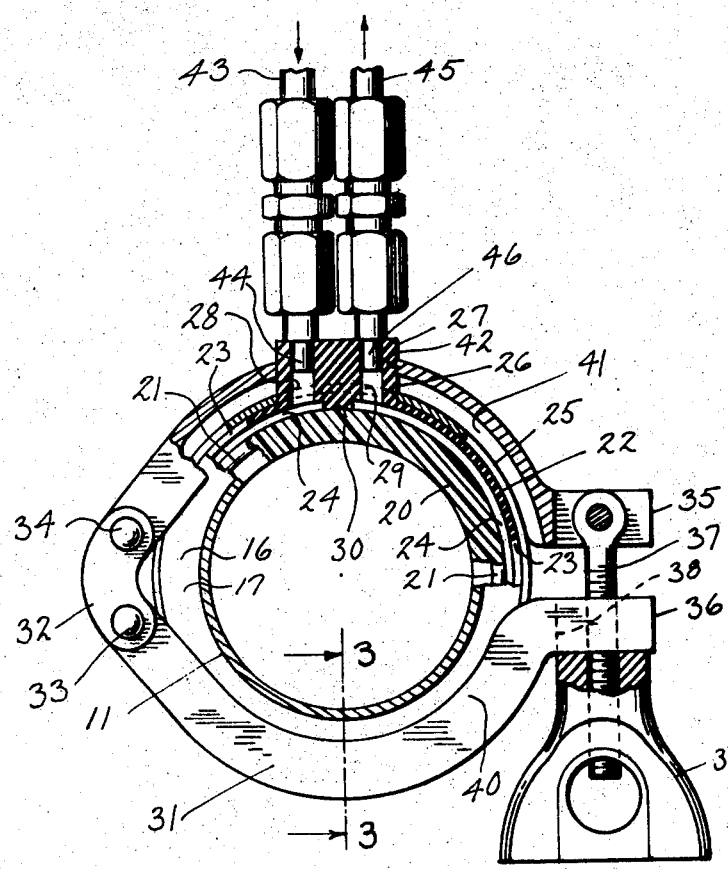
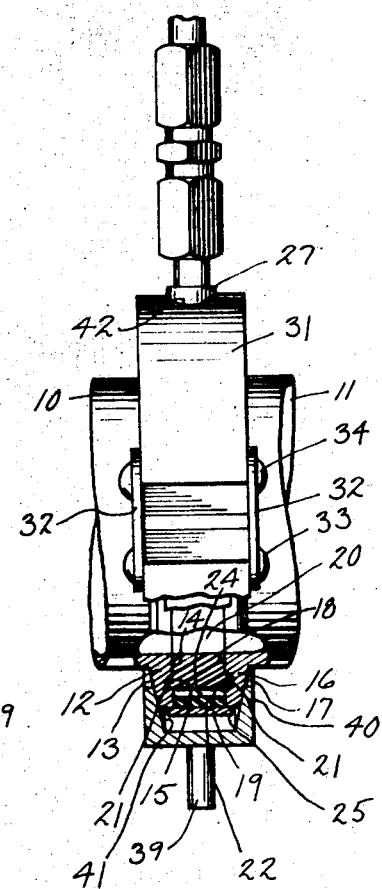
Fig.3
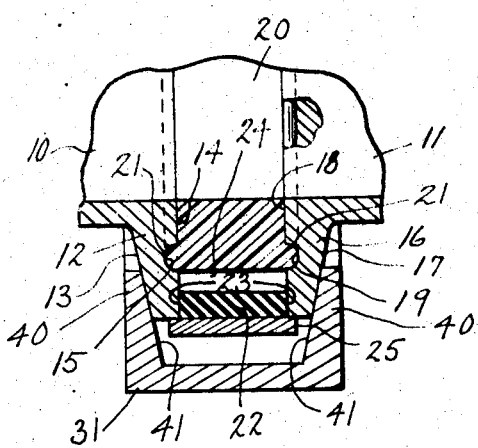
Fig.4
INVENTOR
BRUNO H. WERRA
BY
Morsell & Morsell
ATTORNEYS

ASEPTIC JOINTS

BACKGROUND OF THE INVENTION

1. Field of the Invention

The present invention is adapted for use in the joints of conduits through which food is being pumped in liquid or semiliquid condition.

2. Description of the Prior Art

Heretofore, when liquid food products are being pumped through a conduit under considerable pressure, some of the food material may find its way through a joint in the pipe line sufficiently far to become contaminated by external bacteria. These bacteria might later find their way back through the food product, and through the joint, into the food inside of the pipe line with resulting contamination. Also, under a vacuum condition in the conduit, external bacteria might migrate through the pipe line joint into the food which is inside of the pipe line with resulting contamination.

SUMMARY OF THE INVENTION

In the preferred embodiment of the present invention adjacent pipe ends have outwardly projecting annular flanges whose opposing faces are formed with annular grooves. A gasket of slightly flexible but relatively hard plastic material fits between said flanges and has its end faces provided with annular ribs which fit within the annular grooves of the flanges. The OD of the gasket is of less diameter than the OD of the flanges to provide an annular groove within which a rubber ring is received, the latter having a cross section to provide an annular steam chamber surrounding the plastic gasket. The rubber ring has a nipple for accommodating inlet and outlet ducts with a dam between, which ducts communicate with said annular steam chamber. Clamping means such as a split clamping ring serves to removably hold the joint in assembled condition and said clamping ring has an opening for accommodating the nipple.

An object of the invention is to provide, in a pipe line joint, an annular steam chamber which is so located that bacteria entering from the outside will be steam sterilized before they can come in contact with the food product within the pipe line.

A further object of the invention is to provide an aseptic joint having such steam chamber and which includes the use of a sealing gasket, the parts being readily removably held in assembled condition.

A further object of the invention is to provide an aseptic joint which may be quickly disassembled for separate cleaning or replacement of parts, and which is easily reassembled.

A further object of the invention is to provide an aseptic joint which is relatively simple in construction, and otherwise well adapted for the purposes described.

With the above and other objects in view, the invention consists of the improved aseptic joint and all of its parts and combinations, as set forth in the claims, and all equivalents thereof.

BRIEF DESCRIPTION OF THE DRAWING

In the accompanying drawing, illustrating one complete embodiment of the preferred form of the invention, in which the same reference numerals designate the same parts in all of the views:

FIG. 1 is a transverse sectional view through a pipe line looking at one end of the aseptic joint, parts being broken away and shown in section;

FIG. 2 is a side view of the joint, parts being broken away and shown in section;

FIG. 3 is a sectional view taken on the line 3—3 of FIG. 1; and

FIG. 4 is a fragmentary perspective view showing part of the rubber ring near the steam connections.

DESCRIPTION OF THE PREFERRED EMBODIMENT

Referring more particularly to the drawing, the numerals 10 and 11 indicate aligned conduits of the type through which a food product in liquid or semiliquid condition may be pumped. Usually such conduit is formed of stainless steel. The conduit 10 has an outwardly directed annular flange 12 (see FIG. 3) having a tapered inner face 13 and having a straight outer face 14 provided with an annular groove 15. The pipe section 11 has an outwardly projecting annular flange 16 provided with a tapered inner face 17 and with a straight outer face 18 provided with a circular groove 19.

Between the faces 14 and 18 is a ring-shaped gasket 20 formed of any suitable material. It is preferred to use a slightly flexible, relatively hard plastic material such as "Teflon," which is heat resistant. The gasket has end faces with circular beads 21 which are so positioned and of such size as to fit into the circular recesses 15 and 19 of the pipe flanges when the gasket is in assembled position. This will hold the gasket 20 with its ID flush with the ID of the pipes 10 and 11 and with its OD terminating intermediate the length of the pipe flanges 12 and 16.

Within the annular space which is disposed outwardly of the OD of the gasket 20 and between the flanges 12 and 16 is a flexible ring 22 of molded rubber or molded synthetic rubber material, hereinafter termed rubberlike material, which is rectangular in cross section, as shown in FIG. 3, to provide side faces 23, there being an annular steam chamber 24 between the ring 22 and the OD of the gasket 20. The rubber ring 22 is preferably bonded to a metal ring 25 of stainless steel or the like. Projecting radially outwardly of the rubber ring and through a slotted opening 26 of the metal ring 25 is an integral nipple 27 of the same material as the ring 22. This nipple has a steam inlet passageway 28 and a steam outlet passageway 29, both of which communicate with the steam chamber 24. The rubber ring has a dam 30 which projects inwardly to seat against the OD of the gasket 20, as shown in FIG. 1. This is located between the steam inlet 28 and the outlet 29 to cause the steam entering the inlet 28 to circulate around the ring before it exits from the steam outlet 29.

The flanges 12 and 16 may be clamped together in any suitable manner. However, it is preferred to use a quickly manipulatable clamping ring 31, as shown in FIG. 1, which has sections hinged to hinge elements 32 as at 33 and 34. The clamping sections have outwardly projecting lugs 35 and 36 opposite the hinge. A threaded bolt 37 has one end pivoted to the lug 35 and is swingable into and out of an open ended slot 38 in the lug 36. A nut 39 may be manipulated to draw the ends of the clamping ring together. The clamping ring has flanges 40 provided with internal tapered faces 41 which coact with the tapered faces 13 and 17 of the pipe flanges to draw the flanges toward one another into tight engagement with the gasket 20 and with the side faces 23 of the rubber ring at 22. The clamping ring has a slotted opening 42 through which the rubber nipple 27 projects.

An inlet conduit 43 leading from a suitable source of steam has a tubular projection 44 which may be removably inserted in the inlet passageway 28 of the rubber nipple. An outlet conduit 45 for the steam has a tubular projection 46 which is removably insertable in the steam outlet 29 of the rubber nipple 27. Thus steam may be discharged through the outlet conduit 45 after it has circulated nearly 360° in the annular steam chamber 24 of the joint.

In use, steam is kept circulating into and out of the joint while food is being pumped through the conduits 10, 11 at the relatively high pressure commonly used in this type of equipment. Heretofore, because of the pressure from the pump, there was always the possibility of some of the food material working through the joint and getting contaminated by bacteria from the exterior, which could then work its way back into the pipe line by way of the escaping food product. Conversely, should the conduit for some reason develop a vacuum condition, external bacteria could migrate through the pipe line joint and contaminate the food product in the conduit. With the present invention, any bacteria which might enter the joint from the outside would be sterilized by steam in the chamber 24 of the joint or by steam from said chamber which forced its way between the faces 23 of the rubber ring and the outer faces of the metal flanges of the pipe line. The inner peripheral portions of the flexible ring 22 will not fit tightly against the OD of the gasket 20, so that steam under pressure from the chamber 24 will be forced between the inner peripheries of the flexible ring 22 and gasket 20, and between the faces 23 and the faces 14 and 18 of the flanges, so that any bacteria which might enter from the exterior will be contacted by steam and sterilized before they could work through the joint between the gasket and the flanges to the interior of the pipe line to contact the food product therein.

I wish it to be understood that I do not desire to be limited to the exact details of construction shown and described, for obvious modifications will occur to a person skilled in the art.

I claim:

1. In a pipe line having adjacent end portions located at a joint, said end portions having outwardly projecting annular flanges, a ring-shaped gasket between and sealingly engaging said flanges, means at said joint forming an annular steam chamber between said flange and gasket, means for circulating steam through said chamber, said chamber being so positioned around the joint that bacteria entering the joint from the exterior are sterilized by steam before they can pass the gasket to enter the interior of the pipe line, and means for detachably maintaining the parts in assembled condition at said joint.

2. An assemblage as claimed in claim 1 in which the outside diameter of the gasket is less than the outside diameter of the flanges to leave an annular space between outer portions of the flanges, and wherein means which forms the annular steam chamber is located in said annular space.

3. An assemblage as claimed in claim 2 in which the means which forms the annular steam chamber is a flexible ring having spaced annular side faces, and in which said flexible ring is located in said annular space with the side faces of the flexible ring against the flanges of the pipe ends, the steam chamber being between the flexible ring and the outside diameter of the gasket.

4. An assemblage as claimed in claim 3 in which the outside diameter of the flexible ring is bonded to a wider metal ring having annular portions on each side of the flexible ring which seat against the outer peripheries of the flanges of the pipe ends.

5. An assemblage as claimed in claim 3 in which the flexible ring has an outwardly projecting nipple having inlet and outlet passageways for the steam.

6. An assemblage as claimed in claim 4 in which the flexible ring has an outwardly projecting nipple having inlet and outlet passageways for the steam, and in which said metal band has a slot through which the nipple projects.

7. An assemblage as claimed in claim 1 in which the opposed faces of the flanges of the pipe ends have circular grooves, and in which the gasket has circular ribs of such size and so positioned as to fit within the grooves while maintaining the internal diameter of the gasket flush with the internal diameter of the pipe line.

8. An assemblage as claimed in claim 3 in which the means for detachably maintaining the parts in assembled condition is a clamping ring which coacts with the flanges of the pipe ends, said ring having a slot, and in which the flexible ring has a nipple which projects through the slot of said clamping ring, said nipple having outlet and inlet passageways for steam.

9. An assemblage as claimed in claim 2 in which there is a dam across the annular steam chamber, and in which the means for circulating steam through said chamber includes an inlet communicating with the steam chamber on one side of the dam and an outlet communicating with the steam chamber on the other side of the dam.

10. An assembled as claimed in claim 2 in which the gasket is formed of a relatively hard, slightly flexible material, and in which the means which forms the annular steam chamber is formed of a relatively flexible, resilient rubberlike material.